Figure 1:
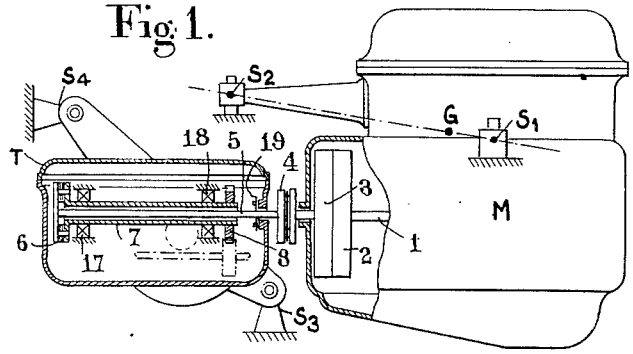

United States Patent Office 3,052,312
Patented Sept. 4, 1962

3,052,312
SUSPENSION DEVICE FOR THE POWER UNIT AND
DRIVE MEMBERS OF AUTOMOTIVE VEHICLES
Jean Cadiou, Paris, France, assignor to Societe Anonyme
Andre Citroen, Paris, France
Filed May 5, 1959, Ser. No. 811,024
Claims priority, application France May 7, 1958
1 Claim. (Cl. 180—54)

The invention relates generally to vehicle suspension systems, and more particularly to a suspension device for supporting the engine and driving members of automotive vehicles.

Heretofore the engine or power unit and the transmission unit or gearbox were generally grouped and constituted a rigid mechanical block assembly, that was supported as a unit by a known suspension system.

It has been found that the design of the suspension system of a power unit should be based on a more selective "specialization" of the different resilient supports, and the present invention provides an improved arrangement wherein the engine or power unit is separated from the reducing gear or transmission unit, these elements being supported and suspended separately by resilient means designed as a function of the reactions likely to be applied to the relevant elements. Thus, the engine may be equipped with suspension means consistent with its maximum torque and with the resultant of the forces of inertia. To this end, this suspension system comprises torque-balancing supports located in a median place close to the centre of gravity of the engine.

Moreover, this suspension system comprises a support adapted notably to compensate the resultant of the forces of inertia and, in general, of the forces acting in the vertical plane coincident with the axis of the crankshaft. This support is positioned, in relation to the centre of gravity, on the side opposite to the line of the main supports.

The reduction gear (that is, the change-speed transmission and the differential) is secured by means of supports having higher coefficients of elasticity than the engine suspension means, and these supports are arranged and designed with a view to enable them efficiently to absorb any reactions resulting from the connection with the road through the road wheels.

The theory on which this invention is based consists in providing two different suspension systems, each suspension system having its bearing members properly directed and elastic characteristics exactly proportioned to the functional behavior of the suspended component.

Another specific feature of this invention is the arrangement of the drive between the engine and the reduction gear, which is so designed as to suppress the reaction stresses of the driven member and of the driving member, and to avoid any interference with the free play of the elastic movements of the suspension of each component.

To this end, the shaft drivingly connecting the engine to the change-speed gear is housed inside the reduction gear case and extends throughout the length thereof. Preferably, this shaft has mounted on its ends, on the engine side and on the gear side, flexible couplings adapted to absorb completely the reactions between the engine and the change-speed gear, so that only the engine torque will be transmitted therethrough.

Figure 2:
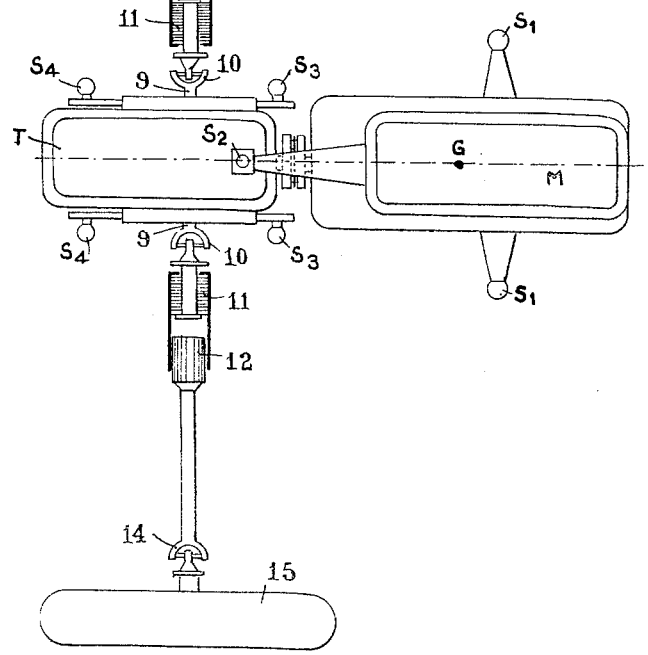

In the attached drawings, FIG. 1 illustrates in elevational side view partially in section the principle of the suspension of the power unit and transmission assembly, and also the driving connection between the engine and the reduction gear. FIG. 2 illustrates in plan view the subject matter of FIG. 1 relative to a driving axle with attached wheels of a motor vehicle.

In FIG. 1, the engine is suspended in the vicinity of the centre of gravity G by means of two resilient lateral supports $S_1$ disposed exactly in the transverse median plane of the cylinder block and on the other hand by means of a third resilient support $S_2$ disposed beyond the centre of gravity. The reduction gear case T is suspended by means of a pair of supports $S_3$ and another pair of supports $S_4$ the two supports of each pair being disposed symmetrically in relation to the axis of the reduction gear. The one of said two pairs of supports may be changed if desired to a single support located in the axial plane of the vehicle.

FIG. 1 also shows the driving connection between the engine and the reduction gear, wherein the engine crankshaft 1 is provided with a flywheel 2 followed by a clutch 3. A flexible coupling 4 drives the intermediate shaft 5 having an extension through the reduction gear which has its other end secured to another flexible coupling 6 driving through a tubular shaft 7 the gears 8 of the reduction gear. Bearings 17 and 18 support the tubular shaft.

Of course, the reduction gear may be of any other design, and couplings of a type differing from the flexible couplings illustrated may be used, provided that they are adapted to absorb the minor oscillations permitted by the supports.

This mounting of the transmission shaft is advantageous in that it avoids any reaction stresses from the driving and driven members, and that it will not interfere with the free play of the elastic functions of the suspension means of the components concerned.

FIG. 2 shows the position of the individually supported engine M and gear case T relative to two driven composite axles. Each of the composite axles is designated by numerals 11, 12 and 14 and is attached by one end to the axles 9 of the gear case T and by the other end to a wheel 15.

Of course, many modifications may be brought to the form of embodiment shown in the attached drawings and described hereinabove, without departing from the spirit and scope of the invention as set forth in the appended claim.

What I claim is:

A device for separately suspending the power unit comprising a driving shaft and the transmission system comprising a tubular transmission shaft rotatably connected with the driving shaft of a vehicle having a drive axle and a frame, said device comprising three resilient supports mounted on said frame for resiliently suspending said power unit, one of said supports being disposed in the vertical plane of the driving shaft in the region of said connecting point between said transmission shaft and said driving shaft, the other two supports being disposed symmetrically in relation to the vertical plane of said driving shaft and in a transverse plane of said power unit which passes through the conjugate point of oscillation of said first support in relation to the center of gravity of said power unit, four other resilient supports mounted on said frame for resiliently supporting said transmission system, said four other resilient supports comprising two pairs of supports disposed respectively forwardly and rearwardly of said axle, the two supports of each pair being disposed symmetrically in relation to the vertical plane of said transmission shaft and one pair being above and the other below the center of gravity of said transmission system, and flexible connecting means for transmitting the torque from the driving shaft of the power unit to said tubular transmission shaft, said connecting means comprising a flexible coupling at the end of said driving shaft, an intermediate shaft connected at one end to said flexible coupling, said intermediate shaft being received within the tubular transmission shaft, and another flexible coupling connecting the other end of said intermediate shaft to the end of said transmission shaft farthest away from said power unit.

References Cited in the file of this patent

UNITED STATES PATENTS

| | | |
|---|---|---|
| 1,564,739 | Winn | Dec. 8, 1925 |
| 1,778,028 | Horine | Oct. 14, 1930 |
| 1,887,862 | Simmen | Nov. 15, 1932 |
| 2,123,226 | Benedek | July 12, 1938 |
| 2,185,165 | Wolf | Dec. 26, 1939 |
| 2,199,517 | Best | May 7, 1940 |
| 2,247,300 | Klavik | June 24, 1941 |